(12) United States Patent
Julson et al.

(10) Patent No.: US 9,479,220 B2
(45) Date of Patent: Oct. 25, 2016

(54) METHODS AND SYSTEMS FOR DETECTION AND ANALYSIS OF ABNORMALITIES IN A POWER LINE COMMUNICATION NETWORK OF A VEHICLE

(71) Applicant: GM GLOBAL TECHNOLOGY OPERATIONS LLC, Detroit, MI (US)

(72) Inventors: Timothy D. Julson, Rochester Hills, MI (US); Moshe Laifenfeld, Haifa (IL); Gary W. Taraski, Oxford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 81 days.

(21) Appl. No.: 14/551,751

(22) Filed: Nov. 24, 2014

(65) Prior Publication Data

US 2016/0149612 A1    May 26, 2016

(51) Int. Cl.
*H04B 3/46*    (2015.01)
*H04L 12/403*  (2006.01)
*H04B 3/54*    (2006.01)
*H04L 12/40*   (2006.01)

(52) U.S. Cl.
CPC .............. *H04B 3/46* (2013.01); *H04B 3/542* (2013.01); *H04L 12/403* (2013.01); *H04L 2012/40273* (2013.01)

(58) Field of Classification Search
CPC ....... H04B 3/46; H04B 3/542; H04L 12/403; H04L 2012/40273
USPC ............... 375/257, 224; 280/735, 734, 543; 324/543
See application file for complete search history.

(56) References Cited

U.S. PATENT DOCUMENTS 5,530,360 A * 6/1996 Kerchaert ............... B60T 8/885
                                                  324/379

* cited by examiner

*Primary Examiner* — Rahel Guarino
(74) *Attorney, Agent, or Firm* — Lorenz & Kopf, LLP

(57) ABSTRACT

Methods and systems are provided for detection and analysis of abnormalities in a power line communication network of a vehicle. The vehicle includes various vehicle modules. The power line communication network includes power lines designed to carry electric power to the vehicle modules. Each vehicle module includes a power line communication module that is communicatively coupled to at least one of the power lines. The power line communication modules enable the power lines to communicate communication information to and from the vehicle modules. The power line communication modules can communicate pilot signals over the power line communication network. One or more of the power line communication modules includes a reflectometer module configured to perform reflectometry processing on the pilot signals to determine properties of the power line communication network.

20 Claims, 7 Drawing Sheets

METHODS AND SYSTEMS FOR DETECTION AND ANALYSIS OF ABNORMALITIES IN A POWER LINE COMMUNICATION NETWORK OF A VEHICLE

TECHNICAL FIELD

The present invention generally relates to vehicles, and more particularly relates to detecting and analyzing abnormalities in a power line communication network of a vehicle.

BACKGROUND

Power-line communication (PLC) generally refers to technologies in which a power line that is designed to carry electric power also carries data or communication signals between two nodes in a network. Power-line communications systems operate by adding a modulated carrier signal to the wiring system. PLC can eliminate the need for installation of dedicated communication lines when power lines are available.

Recently, power-line communication has been proposed for use in vehicles to reduce the number of wires needed in a vehicle by sending communication signals over the vehicle's existing power-lines. PLC technology enables communication of information such as data and control information over existing direct current (DC) battery power-lines. Use of PLC in vehicles can reduce and/or eliminate the need for some wiring that would normally be included in the vehicle to carry communication information, which in turn can reduce the cost and weight of vehicles that utilize separate power and control wiring.

Power lines in a vehicle form a complex network. Poor connections, disconnects and shorts can happen during assembly process or after vehicle use. One potential issue in utilizing PLC in vehicle applications is that changes, faults or defects in the power lines, or the modules that they are connected to, can be difficult to detect. The detection task is further complicated due to the fact that power lines are neither terminated nor impedance matched. Moreover, different loads, stubs, and different gauge wires can form discontinuities that generate reflections.

Accordingly, it is desirable to provide methods and systems that can allow for abnormalities, such as changes, defects or faults, in power lines of the vehicle to be detected, located, identified and/or characterized. Furthermore, other desirable features and characteristics of the present invention will become apparent from the subsequent detailed description of the invention and the appended claims, taken in conjunction with the accompanying drawings and this background of the invention.

BRIEF SUMMARY

Methods and systems are provided for detection and analysis of abnormalities in a power line communication network of a vehicle.

In one embodiment, a vehicle is provided that includes various vehicle modules. The power line communication network includes power lines designed to carry electric power to the vehicle modules. Each vehicle module includes a power line communication module that is communicatively coupled to at least one of the power lines. The power line communication modules enable the power lines to communicate communication information to and from the vehicle modules. The power line communication modules can communicate pilot signals over the power line communication network. One or more of the power line communication modules includes a reflectometer module configured to perform reflectometry processing on the pilot signals to determine properties of the power line communication network.

A system is provided for detecting abnormalities in a power line communication network of a vehicle. The system includes a plurality of vehicle modules each comprising a power line communication module. The power line communication network includes power lines designed to carry electric power to the vehicle modules. The power line communication modules enable the power lines to communicate communication information to and from the vehicle modules. One of the power line communication modules communicates pilot signals over the power line communication network, and another one of the power line communication modules comprises a reflectometer module that is configured to perform reflectometry processing on the pilot signals to detect abnormalities in the power line communication network.

A method can be implemented in a vehicle that includes a power line communication network having power lines designed to carry electric power and communication information to and from a plurality of vehicle modules each having a power line communication module. Pilot signals from one or more of the power line communication modules can be communicated over the power line communication network. When a change from an existing electrical state to a new electrical state occurs, a reflectometer module at one or more of the power line communication modules can process the pilot signals to determine whether an abnormality has been detected in the power line communication network.

BRIEF DESCRIPTION OF THE DRAWINGS

The present invention will hereinafter be described in conjunction with the following drawing figures, wherein like numerals denote like elements.

DETAILED DESCRIPTION

Figure 1:
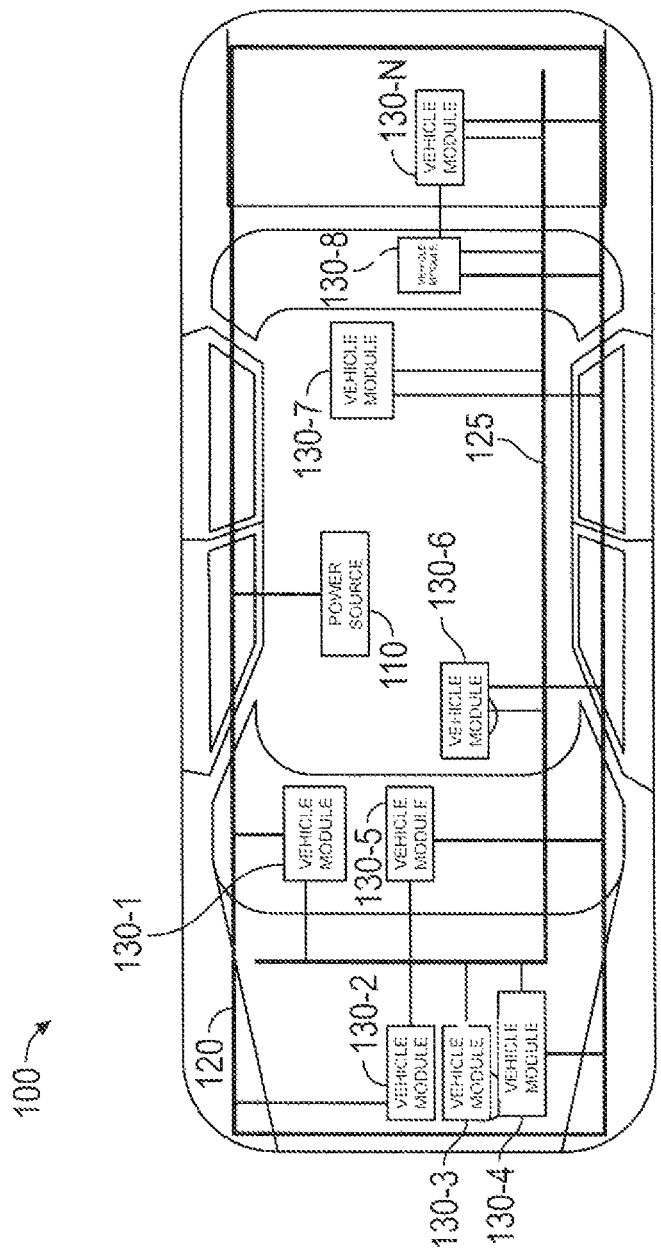
FIG. 1 illustrates a vehicle in accordance with various embodiments

The following detailed description is merely exemplary in nature and is not intended to limit the invention or the application and uses of the invention. Furthermore, there is no intention to be bound by any theory presented in the preceding background or the following detailed description.

Overview

In accordance with the disclosed embodiments, a vehicle is provided having a cost-effective, on-board diagnostic system for detecting abnormalities (e.g., potential or actual faults) in power lines, vehicles modules that the power lines are coupled to, and the return path (ground). The on-board diagnostic system can reduce time needed for diagnostic analysis at a repair shop.

The system includes a plurality of vehicle modules that are coupled to a power line communication network. Depending on the implementation, Power Line Communication (PLC) modules can be implemented at some or all of the vehicle modules such that some (or all) of the vehicle modules can include a PLC module. Each PLC module allows communication information to be communicated over the vehicle's power lines. The PLC modules thus form a power line communication network. By providing PLC modules throughout the vehicle, the need for dedicated communications (or signal) wiring to/from the vehicle modules can be reduced or completely eliminated in some cases. Further, the need for dedicated communications (or signal) circuitry at the vehicle modules can also be reduced or completely eliminated in some cases.

In accordance with various embodiments, one, some or all of the PLC modules can include a reflectometer module.

The PLC modules transmit and receive pilot signals over the vehicle's power lines. The PLC modules can determine when there has been a change in the vehicle's current electrical state based, for example, on signals from one of the vehicle modules. Each reflectometer module can then use this knowledge of the vehicle's current electrical state to process received pilot signals and perform reflectometry processing techniques to monitor the health of the vehicle's power lines and the vehicle modules. In one embodiment, the pilot signals are pilot subcarriers that are transmitted in known positions of a frequency-time grid (e.g., in each OFDM symbol). A reflectometer module can process the received pilot signals, and compute a channel estimate that can be used to determine properties of power lines and/or vehicle modules of the vehicle including whether any abnormalities are detected.

For example, the reflectometer module can detect one or more abnormalities associated with the power line communication network, such as a change in a particular power line of that network, the return path (ground), or a particular vehicle module coupled to the power line communication network. For instance, the reflectometer module can detect faults or potential faults in power lines, the return path (ground), and/or vehicle modules that the power lines are coupled to. In some embodiments, the reflectometer module can also identify the location of that abnormality, and identify the specific type of abnormality. Information about the abnormalities can then be recorded for later diagnostics.

In some embodiments, the vehicle can include multiple collaborating PLC modules (e.g., each vehicle module can include its own PLC module and reflectometer module). In such embodiments, information provided from different PLC and reflectometer modules can be processed to improve the precision of abnormality detection and identification. In some implementations, information provided from the different PLC and reflectometer modules can be processed by off-board diagnostics equipment to reduce on-board complexity.

FIG. 1 illustrates a vehicle 100 that includes a power source 110 (e.g., a vehicle battery), power lines 120 and a controller area network (CAN) bus 125 connected a number of vehicle modules 130-1 . . . 130-N. Although this drawing illustrates nine vehicle modules 130-1 . . . 130-N, those skilled in the art will appreciate that this is simply one non-limiting example and that a vehicle can include any number of vehicle modules located throughout the vehicle 100.

As used herein, a "vehicle module" refers to a controller module in a vehicle that controls vehicle systems, subsystems, actuators, sensors, switches and the like. Each of vehicle modules can perform a certain function or functions for a controlling a certain vehicle system or sub-system, such as a vehicle body, engine, chassis, etc. Non-limiting examples of vehicle modules can include, for example, an Engine Control Unit (ECU) or Engine Control Module (ECM), Powertrain Control Module (PCM), a Transmission Control Module (TCM), a Body Control Module (BCM), an Extended Body Control Module (EBCM), a Passive Entry Passive Start (PEPS) module, a Power Window and Lock Control Module (PWLCM), an Electrical Parking Brake Control Module (EPBCM), a Door Switch Panel Module (DSPM), a Vehicle Communication Interface Module (VCIM), an Electronic Brake Control Module (EBCM), Vaporizer Control Module (VCM), etc.

The vehicle modules 130 can be coupled to the CAN bus 125 via wired or wireless communication links for communication of information to and from the vehicle modules 130-1 . . . 130-N. Although not illustrated for sake of simplicity, the vehicle 100 may also include a number of hard-wired and wireless peripherals, such as sensors, switches, actuators, etc. Any suitable configuration of vehicle modules and peripherals can be employed.

In accordance with the disclosed embodiments each of the vehicle modules 130 can include a power line communication module (shown in FIGS. 2-4B) that allows a power line communication network (shown in more detail FIG. 2) to be implemented within the vehicle 100.

Figure 2:
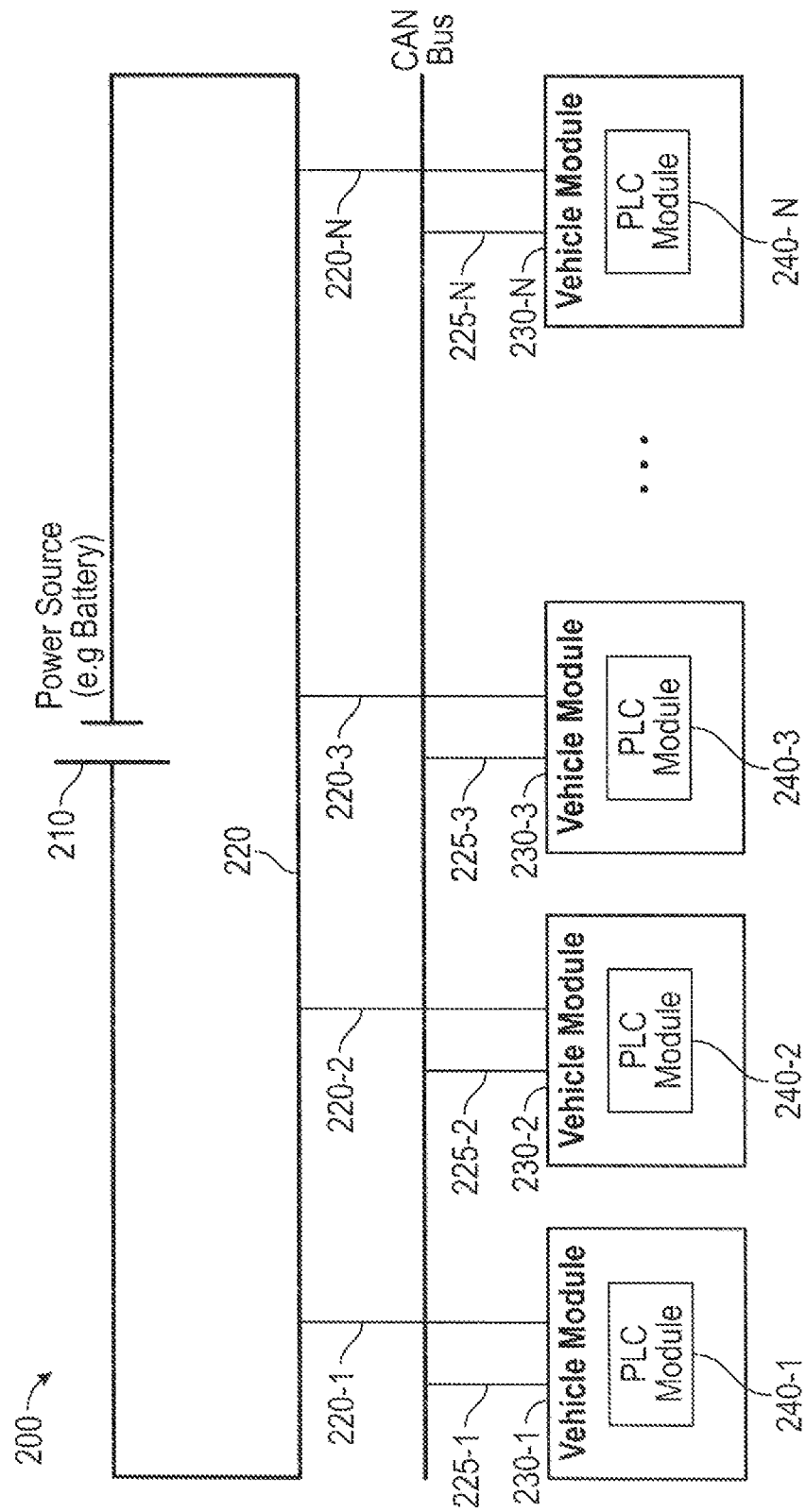
FIG. 2 is a simplified schematic block diagram of a vehicle communications network in accordance with various embodiments.

As shown in more detail in FIG. 2, the network 200 includes a power source 210 (e.g., a vehicle battery), power lines 220, 220-1 . . . 220-N, an optional bus 225 with optional bus lines 225-1 . . . 225-N, and vehicle modules 230-1 . . . 230-N. In one non-limiting embodiment, the bus 225 can be a Controller Area Network (CAN) bus that is complaint with any known CAN bus standard. As is known in the art, CAN bus can refer to a message-based protocol designed for automotive applications that allows microcontrollers, modules and devices within a vehicle to communicate with each other without a host computer.

As used herein, a "power line (PL)" refers to a transmission line (or a conductor) in a vehicle that carries electric power to vehicle modules. The power line can be, for example, a direct current (DC) battery power-line, an alternating current (AC) line (e.g., in an electric vehicle), or any other conventional transmission line that is in a vehicle, etc.). The main power line 220 is electrically coupled to a power source 210, such as a vehicle battery. The main power line 220 is coupled to the vehicle modules 230-1 . . . 230-N via a branch power lines 220-1 . . . 220-N. This way the power lines 220-1 . . . 220-N can provide electrical power to the various vehicle modules 230-1 . . . 230-N of the vehicle from the power source 210. For example, vehicle module 230-1 couples to the main power line 220 via branch power line 220-1.

In accordance with various embodiments, each of the vehicle modules 230-1 . . . 230-N can include a power line communication module 240-1 . . . 240-N. As used herein, a "power line communication (PLC) module" refers to a module that can be implemented at any vehicle module to allow a power line to be used to communicate information (e.g., control information, data, communication signals, etc.). Communications between PLC modules 240 are bidirectional (e.g., the inputs to the PLC network 320 are also outputs). A PLC module includes a power line transceiver (PLT) that includes a transmitter sub-module and receiver sub-module (not illustrated) for facilitating digital communication over a power line. Although not illustrated, each PLC module 240 can include conventional transceiver components including a modem, transmitter and receiver circuitry, amplifiers, filters, oscillators, voltage references, interfaces, etc. A PLC module can interface with ports of any vehicle module to allow a conventional power line to be employed for carrying both power and communication information, thus eliminating the need for special wires for carrying communication information. In some embodiments, the PLC module can use multiplexed digital signaling technology to improve performance in noisy environments. The PLC modules can employ OFDM techniques and send known pilot signals over the power lines.

In accordance with the disclosed embodiments, the power lines 220, 220-1 . . . 220-N are also used as an electrical conductor to carry communications information and signals, such as digital data bits modulated on to a high frequency carrier signal, to and from the various vehicle modules 230-1 . . . 230-N. In one embodiment, CAN protocols are used on the physical layer of the PLC modules. In comparison to traditional vehicle communications networks, this can reduce the number of wires required for the network. In some embodiments, the bus 225 is not employed and the power lines 220 can be the "backbone" used to carry communication information over the network.

By contrast, certain communications architectures may communicate communication information over both the bus 225 and the power lines 220-1 . . . 220-N. Thus, in some embodiments, the network 200 may also include the bus 225, and each of the vehicle modules 230-1 . . . 230-N can be electrically coupled to the bus 225 via a corresponding bus line 225-1 . . . 225-N. The vehicle modules 230 can communicate information on the bus 225 so that it can be received by any one of other vehicle modules 230 coupled to the bus 225. Each of the vehicle modules 230 can receive, for example, control and command messages over the bus 225.

Figure 3A:
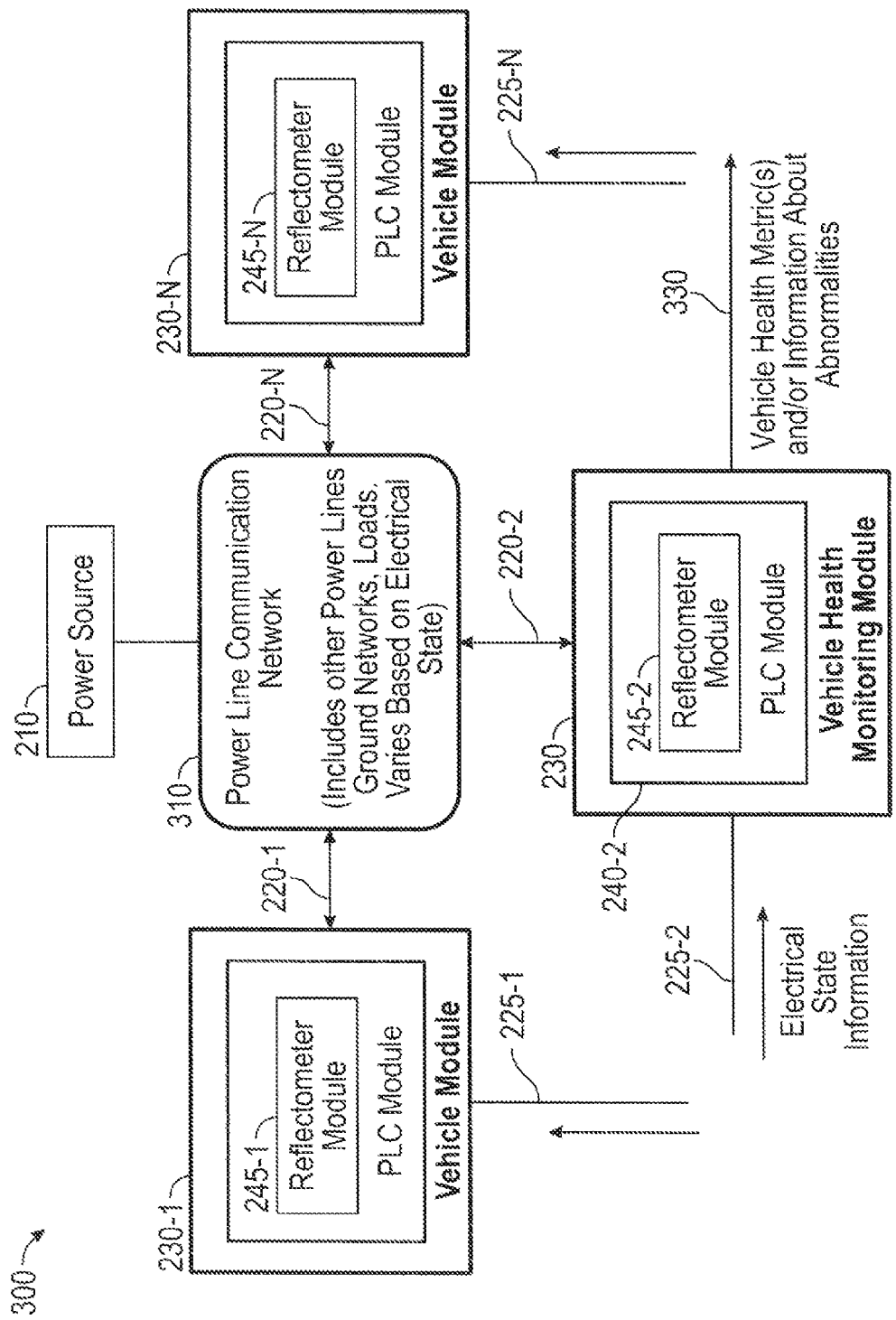
FIGS. 3A and 3B are simplified schematic block diagrams that illustrate embodiments of a vehicle health monitoring system 300 implemented within a vehicle in accordance with various embodiments.
Figure 3B:
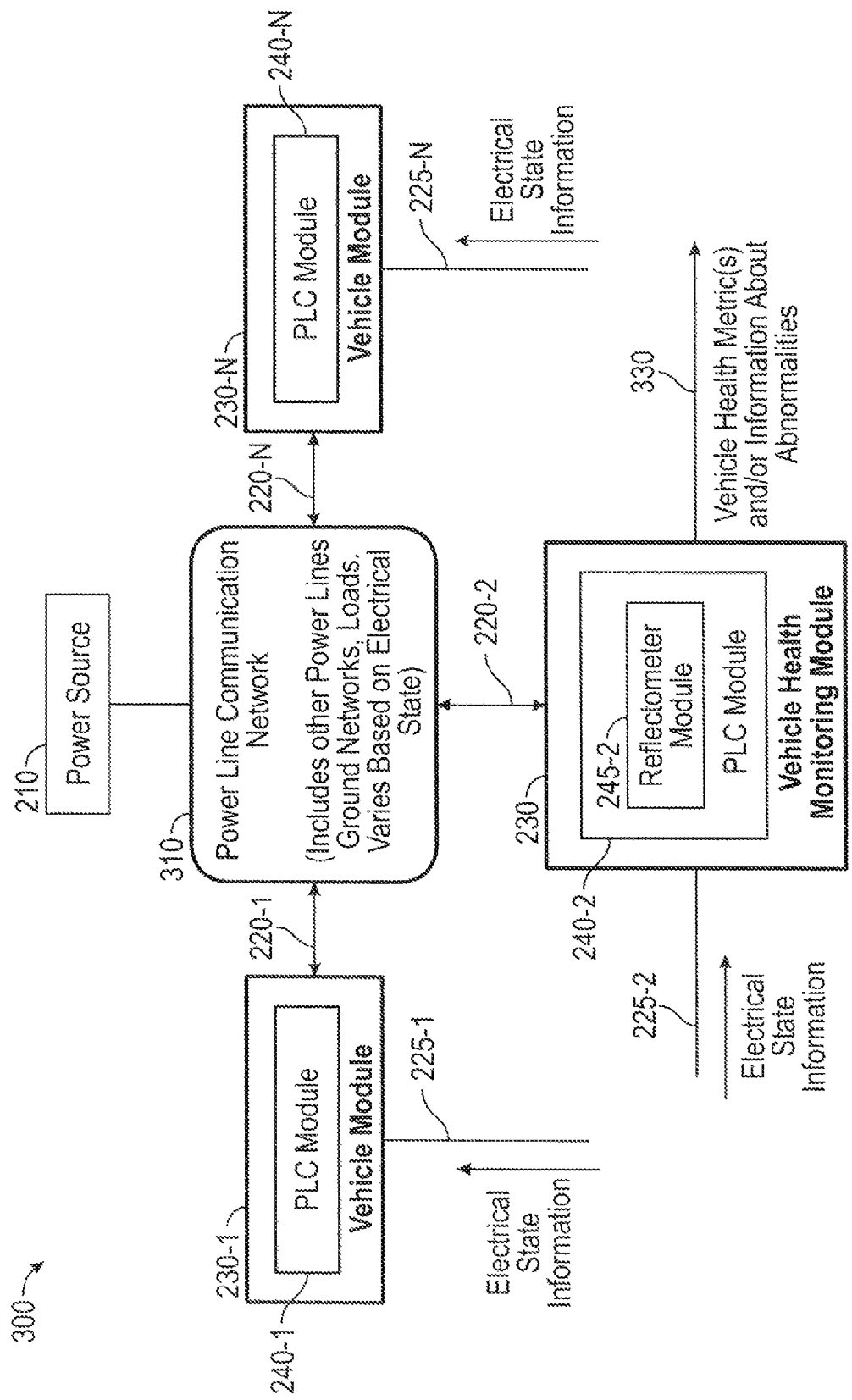

FIGS. 3A and 3B are simplified schematic block diagrams that illustrate embodiments of a vehicle health monitoring system 300 implemented within a vehicle (e.g., FIG. 1) in accordance with various embodiments. As shown in FIGS. 3A and 3B, the vehicle health monitoring system 300 includes a power source 210, power lines 220-1 . . . 220-N, bus lines 225-1, vehicle modules 230, and a vehicle health monitoring module (VHMM) 320 that are all coupled to a power line communication network 310. Because the power source 210, power lines 220-1 . . . 220-N, bus lines 225-1, and vehicle modules 230-1 . . . 230-N are already described above with reference to FIGS. 1 and 2, the description of those elements will not be repeated again, but will be described below with reference to FIG. 2.

The PLC network 320 can be viewed as a communication system that has many inputs and outputs. The power line communication (PLC) network 310 includes power lines (not illustrated), ground networks, and various loads within the vehicle that are not illustrated individually for sake of simplicity. The power lines 220-1 . . . 220-N are also part of the power line communication network 310 even though they are illustrated external to it to illustrate how they are coupled to the vehicle modules 230-1 . . . 230-N.

The physical layer of the power line communication network 310 defines a power line communication (PLC)) channel that carries signals between PLC modules. The characteristics of PLC channel vary depending on the electrical state of the vehicle. For a particular electrical state of the vehicle, the PLC network 320 can be viewed as a linear time invariant (LTI) system that can be fully characterized by its frequency response (or equivalent impulse response). The frequency response of the PLC network 320 is a continuous function of phase and amplitude as a function of frequency. The frequency response of the PLC channel is the Fourier transform of its impulse response. The frequency response includes magnitude and/or phase information measured at a discrete set of frequency values over a finite RF frequency range or "bandwidth" (e.g., a set of magnitudes and phases measured for each frequency band or subcarrier of a set of subcarriers). The frequency response of the PLC network 320 captures physical phenomena such as attenuation, reflections, radiation/heat losses over resistive loads, etc., when RF signals propagate through the PLC network 320

The "communications channel state" of "channel state" can be estimated by observing characteristics of the frequency response of the PLC network 320 within a finite RF frequency range. The PLC channel can be observed by sending signals on the inputs of the PLC network 320 (e.g., one at a time) and measuring them at its outputs (e.g., all at once).

Many different known PLC channel estimation methods can be used to compute the channel estimate. These PLC channel estimation methods depend on the communication modulation techniques used. For example, in one embodiment, in an OFDM-based system, the bandwidth is divided into frequency bands, and known pilot signals are embedded in a subset of these frequency bands. The PLC channel can be observed by measuring the phase and amplitude of known pilot signals and computing a channel estimate. To explain further, a receiver can estimate the channel state by observing these known pilot signals in the different frequency bands. Each pilot signal is processed to generate a single pair of phase and amplitude for that particular frequency band (and that particular time and electrical state). As such, there is a discrete phase/amplitude pair for each particular frequency band. Each discrete phase/amplitude pair serves as a discrete channel estimate.

Any change in electrical state of the vehicle can impact the PLC channel because, when the electrical state changes, different loads are coupled to or connected to the power lines of the vehicle. To explain further, when a change in electrical state occurs, different systems are or are not connected to the power line communication network, and the loads coupled to the power lines and input impedances of various vehicle modules can change. As a result, characteristics of the power line communication network 310 can change depending on the electrical state of the vehicle.

The electrical state of the vehicle can change in response to any number of conditions or events. As one example, a change in electrical state can occur, for example, when any operating mode of the vehicle changes (e.g., the vehicle's ignition is turned on or off, lights are switched on or off, the infotainment system is turned on or off, etc.).

In response to any of these conditions or events, electrical state information indicating a change in the electrical state can be determined or detected by any vehicle module, and then communicated to each PLC module that includes a reflectometer module over a bus line 225-1 or other wired or wireless communication connection to the vehicle module. For example, a change in electrical state can be signaled to the vehicle module by another vehicle module such as the ECU, BCM, etc.

The number of PLC modules varies depending on the implementation. For illustration purposes, the power line communication network 310 of FIGS. 3A and 3B show three PLC modules, but it should be understood that this implementation is non-limiting, and that the power line communication network 310 can include any number of PLC modules 240-1 . . . 240-N that is greater than two. A couple use cases will now be described.

In one embodiment, the power line communication network can include a single pair of PLC modules (i.e., one transmitter-receiver PLC module pair). Since the power lines are all connected into a single network then potentially any abnormality will manifest itself in a modification to the frequency response of any link (and hence the channel estimate). Therefore a single pair of PLC modules (i.e., one transmitter-receiver PLC module pair) has the potential to detect any abnormality on the power line communication network.

However, with only a single pair of PLC modules (i.e., one transmitter-receiver PLC module pair) the distances between different abnormalities and normal channel estimates may be very small, resulting in unreliable detection (e.g., high false detection rate or low detection rate). Furthermore, if more than a single abnormality is present, then a single pair of PLC modules (i.e., one transmitter-receiver PLC module pair) cannot distinguish between the two or more abnormalities.

In other embodiments, the power line communication network can include multiple pairs of PLC modules (i.e., multiple transmitter-receiver PLC module pairs). Having multiple pairs of PLC modules can be advantageous in terms of detection performance and distinguishability, for example, in situations where multiple abnormalities can be present.

The VHMM 320 is a diagnostics module that includes a reflectometer module 245-2. The processing performed by the VHMM 320 varies depending on the implementation. FIG. 3A illustrates a "distributed" architecture embodiment of the vehicle health monitoring system 300, whereas FIG. 3B illustrates a "centralized" architecture embodiment of the vehicle health monitoring system 300.

The vehicle health monitoring system 300 of FIG. 3A is an example of a "distributed" architecture embodiment in which the Vehicle Health Monitoring Module 320 has a PLC module 240-2 and a reflectometer module 245-2, and each PLC module 240-1, 240-N also has a reflectometer module 245-1, 245-N. In a distributed architecture, each PLC module can monitor all communication links upon which it can receive, process pilot signals received from a particular PLC module (or a group of PLC modules) in the network. This way the receiver PLC module can compute a channel estimate for each particular PLC module that it is in communication with. In one implementation, each reflectometer module 245 monitors for received pilot signals, and processes them to generate a channel estimate. In some embodiments, each reflectometer module 245 can also process the channel estimate to generate a metric (or attribute) indicative of the health of the network and can determine, based on the metric (e.g., by comparing it to a reference), if any abnormalities are detected in the PLC network 320. If an abnormality is detected by any PLC module 240, that PLC module 240 sends the relevant information to the VHMM 320. This communication can take place over PLC network 310 or any other interconnecting bus (CAN, etc). The VHMM 320 combines or integrates the information received from other PLC modules 240-1, 240-N (as well as information from its PLC module 240-2) to get a more accurate picture of health of the network. The VHMM 320 can then share its observations either offline with a diagnostic tool or online with some central ECU to combine all observations. This way the number of independent observations is roughly squared.

By contrast, the vehicle health monitoring system 300 of FIG. 3B is a "centralized" architecture embodiment in which only the Vehicle Health Monitoring Module 320 has a reflectometer module 245-2. In a centralized architecture, a single, centralized PLC module can be implemented that receives processed information from all possible pairs of transmitter and receiver PLC modules, and will therefore have information about each of the PLC channels that make up the PLC network. In the "centralized" architecture embodiment, the reflectometer module 245-2 receives pilot signals from all other PLC modules 240-1, 240-N, processes them to generate channel estimates, and then process the channel estimates to generate a metric for the health of the network and determines, based on the metric, if any abnormalities are detected in the PLC network 320.

In another "hybrid" architecture embodiment (not illustrated), each PLC module 240-1, 240-N has a reflectometer module that does limited processing and shifts the rest of the processing burden to the VHMM 320. In this embodiment, the VHMM 320 has to process a larger amount of data. To explain further, at each PLC module 240-1, 240-N, a reflectometer module 245-1, 245-N monitors for received pilot signals, and processes the received pilot signals to generate a channel estimate. However, each reflectometer module 245-1, 245-N then communicates their channel estimate to the VHMM 320, which processes the various channel estimates to generate a metric for the health of the network, and then determines, based on the metric, if any abnormalities are detected.

Figures 4A, 4B:
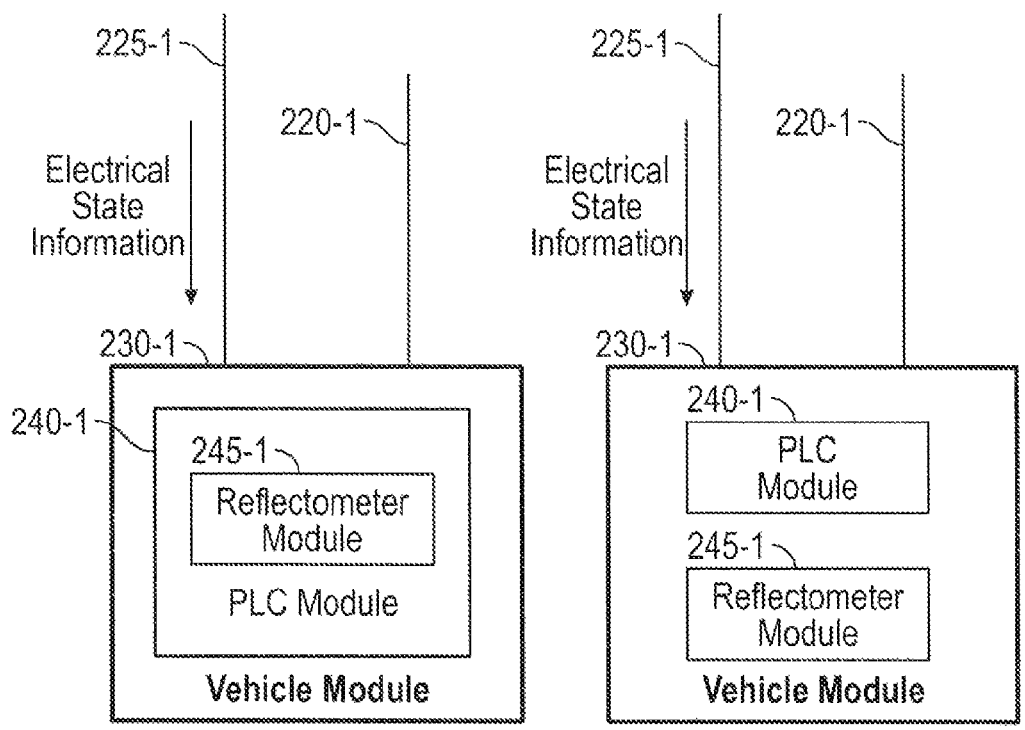
FIGS. 4A and 4B are block diagrams that illustrate two alternative implementations of reflectometer modules in accordance with the disclosed embodiments.

As used herein, a "reflectometer module" or "reflectometry processor" refers to software and/or hardware modules that can be implemented at PLC modules to perform reflectometry processing to determine properties of power lines of the vehicle (e.g., test the integrity of power lines in the vehicle). FIGS. 4A and 4B are block diagrams that illustrate two alternative implementations of the reflectometer modules in accordance with the disclosed embodiments. In some implementations, illustrated in FIG. 4A, in order to reduce cost, the reflectometer module 245-1 can be implemented entirely in software as an additional module that is executed by a processor (not illustrated) of the PLC module 240-1. In such implementations, the reflectometer module can be implemented without requiring an additional hardware. By contrast, in other implementations, the reflectometer module 245-1 can be a separate module having its own hardware and software, and that is implemented at the vehicle module 230-1 and that is in communication with the PLC module.

In accordance with the disclosed embodiments, the reflectometer module can measure information associated with pilot signals communicated over the PLC channel, such as magnitude and/or phase information associated with each of the pilot signals. The reflectometer module can then use this measured information to compute a channel estimate. The reflectometer module can then compare this computed channel estimate to baseline reference information for a particular electrical state in order to determine whether there are abnormalities in the power line communication network of the vehicle. As used herein, "abnormalities" can refer to defects, faults, failures (e.g., poor connections, degraded connections, short circuit conditions, open circuit conditions, or other problematic conditions, etc.) in power lines of the vehicle. In addition, abnormalities can also include abnormalities in vehicle modules (e.g. malfunctions) that manifest themselves by changes in their input impedance.

For example, in one embodiment, discrete channel estimates can be used by a reflectometer module, along with knowledge of the electrical state, to determine if any abnormalities are detected. For instance, the reflectometer module can use the electrical state to access (e.g., look up or retrieve) pre-recorded baseline reference information for that electrical state and a pre-recorded library of abnormal PLC channel estimates for that electrical state. The discrete channel estimates can then be compared to the pre-recorded baseline reference information to determine if an abnormality has been detected.

As will be described in greater detail below, when an abnormality is detected, reflectometry techniques can be used to compare the computed channel estimate to a pre-recorded library of known, abnormal channel estimates for that particular electrical state to further characterize that abnormality (e.g., identify the specific type of abnormality, its location, etc.). For example, discrete channel estimates can be compared to each of the abnormal PLC channel estimates in the pre-recorded library until a matching abnormal PLC channel estimate is found that identifies characteristics of the abnormality (e.g., type and location of the abnormality, etc.).

In general, reflectometry refers to a non-invasive diagnostic technique that allows for the analysis of properties of a medium, such as a power line or power line communication network. Reflectometry methods can generally be classified as "active" or "passive." In active reflectometry methods, a reflectometer actively sends/transmits signals into a network and monitors reflections. In passive reflectometry methods, a reflectometer inspects signals received over a network from other devices. In the context of a PLC network, passive reflectometry methods can employed in which a "source" or transmitter PLC module sends communication signals with known pilot signals over power lines of the PLC network to a destination or receiver PLC module. The receiver PLC module can then estimate the PLC channel based on the known pilot signals. Depending on the embodiment, reflectometry processing can include any number of known techniques.

For example, in one embodiment, a reflectometry processor can employ frequency-domain reflectometry (FDR) techniques. In accordance with one particular embodiment, a frequency-domain reflectometer module (FDR) can receive electrical state information that indicates a current electrical state of the vehicle, and can then compare a channel estimate to a set of reference channel estimates for that particular current electrical state to determine whether there is a match between the actual channel estimate and one of the reference channel estimates for that particular current electrical state. The reference channel estimates for that particular current electrical state can include reference channel estimates that indicate defects, reference channel estimates that indicate faults, reference channel estimates that indicate failures (e.g., poor connections, degraded connections, short circuit conditions, open circuit conditions, or other problematic conditions, etc.) in power lines of the vehicle, reference channel estimates that indicate abnormalities in vehicle modules (e.g. malfunctions) that manifest themselves by changes in their input impedance, etc. Thus, when it is determined which one of the reference channel estimates for that particular electrical state matches the actual channel estimate, the FDR module can identify whether there is a defect, a fault, a failure in power lines of the PLC network (e.g., poor connection, degraded connection, short circuit condition, open circuit condition, or other problematic condition, etc.), or abnormalities in vehicle modules.

Figure 5:
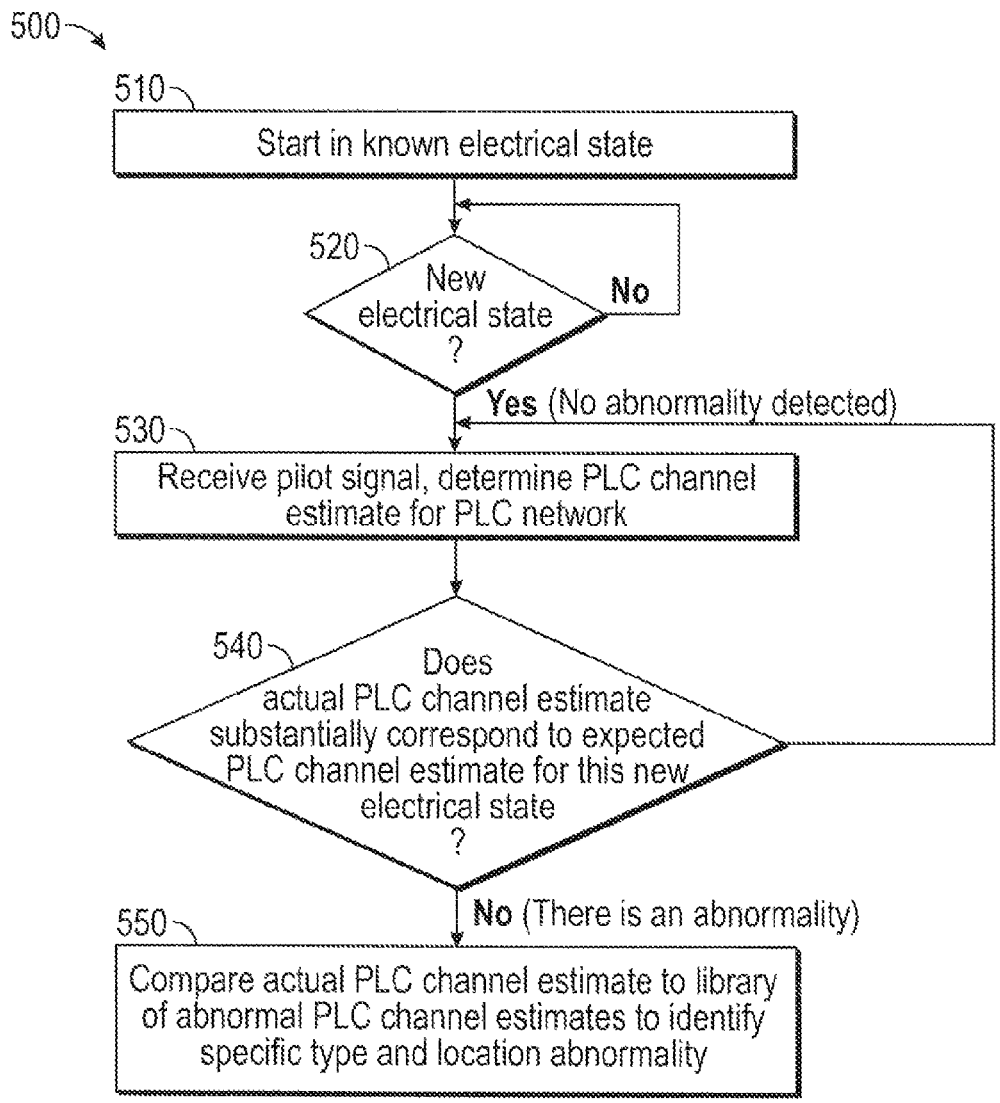
FIG. 5 is a flow chart illustrating a method in accordance with various embodiments.

FIG. 5 is a flow chart illustrating a method 500 in accordance with various embodiments. As a preliminary matter, it should be understood that steps of the method 500 are not necessarily presented in any particular order and that performance of some or all the steps in an alternative order is possible and is contemplated. The steps have been presented in the demonstrated order for ease of description and illustration. Further, steps can be added, omitted, and/or performed simultaneously without departing from the scope of the appended claims. It should also be understood that the illustrated method 500 can end at any time. In certain embodiments, some or all steps of this process, and/or substantially equivalent steps, are performed by execution of processor-readable instructions stored or included on a non-transitory processor-readable medium, for example. For instance, references to a processor performing functions of the present disclosure refer to any one or more interworking computing components executing instructions, such as in the form of an algorithm, provided on a processor-readable medium, such as a memory associated with a processor of a vehicle module, a power line communication module or a reflectometer module (when the reflectometer module is implemented using hardware).

When method 500 begins at 510 the vehicle is in a known electrical state. As used herein, the term "electrical state" with reference to the vehicle refers to a state that takes into account the operating mode of the vehicle with respect to its electrical systems and sub-systems at a given instant of time. In one embodiment, this known electrical state is communicated to or determined by a processor implemented in a vehicle module. The vehicle module can communicate this known electrical state to a PLC module, which in turn can communicate the known electrical state to a reflectometer module.

A processor in the vehicle (e.g., at the PLC module or any other vehicle module) constantly monitors for changes in electrical state. At 520, the processor regularly determines or checks to determine if there has been a change from the known electrical state to a new electrical state. When it is determined at 520 that there has not been a change to a new electrical state, method 500 loops back to 520 where the processor continues to determine if there has been a change to a new electrical state.

As noted above, when a change in electrical state occurs, different loads are coupled to the power lines and input impedances of various vehicle modules can change, which can cause the characteristics of the PLC channel to change. To explain further, there is a physical channel that exists between any transmitter PLC module and any receiver PLC module that are communicating with each other. This is referred to herein as a PLC channel. The receiver PLC module receives pilot signals that are communicated over this PLC channel, and processes these pilot signals to compute a channel estimate. Anytime the electrical state of the vehicle changes, the frequency response (of this PLC channel) that will be observed at the receiver PLC module also changes. Changes in the frequency response of the PLC channel can be observed at the receiver PLC module as changes in the channel estimates that it computes based on the received pilot signals. As such, when there is a change in electrical state, the channel estimate that is observed will vary.

In accordance with the disclosed embodiments, any changes in electrical state can be used to initiate reflectometry processing of pilot signals. Thus, when it is determined that there has been a change to the new electrical state, method 500 proceeds to 530. At 530, the processor can retrieve baseline reference information, and compute a channel estimate of the power line communication network using received pilot signals that the processor has received over the power line communication network. The baseline reference information for this new electrical state can include an expected channel estimate of the power line communication network when it is known to have no abnormalities. For a particular electrical state, if there are no abnormalities, the computed channel estimate should match an expected channel estimate that is specified by the baseline reference information. The baseline reference information can vary depending on the implementation. In one embodiment, the baseline reference information can include an expected channel estimate between a particular pair of PLC modules (i.e., a particular transmitter PLC module and a particular receiver PLC module). For example, in a distributed reflectometry system, each particular receiver PLC module will have baseline reference information associated with it and each particular transmitter PLC module in the network. By contrast, in a centralized reflectometry system, a centralized PLC module will have baseline reference information associated with all possible pairs of transmitter and receiver PLC modules.

For each electrical state, the baseline reference information will be different because different systems and subsystems will be coupled to the PLC network. In other words, for each particular electrical state, baseline reference information is specific to that particular electrical state. As will be described below, the baseline reference information can be used to detect abnormalities in a PLC channel. In one embodiment, the baseline reference information can include a known channel estimate that characterizes normal or expected behavior of the power line communication network (e.g., as a function of frequency) between a particular pair of PLC modules (i.e., a particular transmitter PLC module and a particular receiver PLC module) that are communicating in that particular electrical state. In one embodiment, the baseline reference information can be specific characteristics or features of the expected frequency response (e.g., expected phase/amplitude measurements) between a particular pair of PLC modules that are communicating in that particular electrical state. The method 500 then proceeds to 540, where the processor determines whether the computed channel estimate substantially corresponds to the expected channel estimate for this new electrical state. For example, in one embodiment, the processor can compare the actual, computed channel estimate to the expected channel estimate to determine whether the computed channel estimate is as expected for that particular, new electrical state. Stated differently, the actual computed channel estimate of the power line communication network in the new electrical state can be compared to an expected channel estimate of the power line communication network for that new electrical state.

When the processor determines (at 540) that the computed channel estimate substantially corresponds to (or "matches") the expected channel estimate for this new electrical state, it can be determined that no abnormality has been detected in the PLC network, and the method 500 loops back to 530.

When the processor determines (at 540) that the computed channel estimate does not substantially correspond to (or "match") the expected channel estimate for this new electrical state, this indicates that something about the power line communication channel has changed, such as a change in a particular power line of that network, the return path (ground), or a particular vehicle module coupled to the power line communication network. In other words, an abnormality is associated with the power line communication network (e.g., an abnormality on a power line that the PLC module is coupled to). As such, when the computed channel estimate does not substantially match an expected channel estimate (at 540), it can be determined that an abnormality has been detected, and the method then proceeds to 550.

For each particular electrical state a set or library of known abnormal channel estimates can be generated (e.g., via testing). The set or library of known abnormal channel estimates can then be used to identify the specific type and/or location of the abnormality. To explain further, each abnormal channel estimate is associated with a particular abnormality (e.g., specific type of abnormality). The set or "library" of abnormal channel estimates for a particular electrical state can be a library of references (e.g., characteristic curves or traces). Each reference characterizes a different known, abnormal condition on the power line communication network (e.g., as a function of frequency when operating in that particular electrical state). In one embodiment, the set of abnormal channel estimates for this new electrical state can be a library of references, where each reference includes an abnormal channel estimate between a particular pair of PLC modules (i.e., a particular transmitter PLC module and a particular receiver PLC module). For example, in a distributed reflectometry system, each particular receiver PLC module will have a set of abnormal channel estimates for each electrical state associated with it and each particular transmitter PLC module in the network. By contrast, in a centralized reflectometry system, a centralized PLC module will have a set of abnormal channel estimates for each electrical state associated with all possible pairs of transmitter and receiver PLC modules. As noted above, a set of abnormal channel estimates for each electrical state can include a library of references, where each reference includes an abnormal channel estimate. As will be described below, the libraries can be used to diagnose the specific type and location of the abnormality. By comparing the actual, computed PLC estimate to the set of abnormal channel estimates, a match can be found to thereby identify the specific type of abnormality on the power line communication network.

At 550, the processor compares the computed channel estimate to a set or library of abnormal channel estimates for this new electrical state, and based on this comparison, can find a matching abnormal channel estimate that identifies the specific type and/or location of the abnormality.

Figure 6:
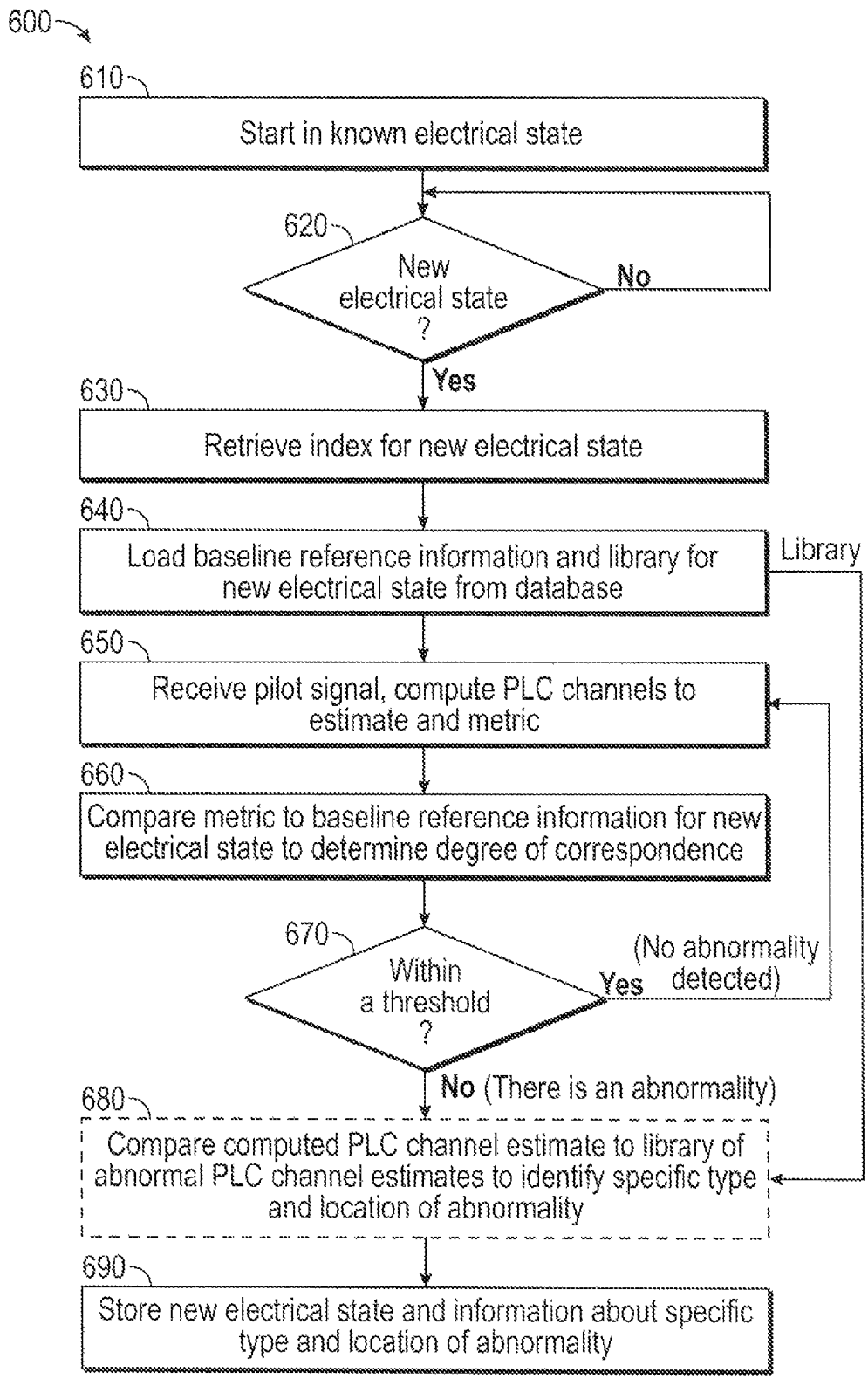
FIG. 6 is a flow chart illustrating another method in accordance with various embodiments.

FIG. 6 is a flow chart illustrating another method 600 in accordance with various embodiments. As a preliminary matter, it should be understood that steps of the method 600 are not necessarily presented in any particular order and that performance of some or all the steps in an alternative order is possible and is contemplated. The steps have been presented in the demonstrated order for ease of description and illustration. Further, steps can be added, omitted, and/or performed simultaneously without departing from the scope of the appended claims. It should also be understood that the illustrated method 600 can end at any time. In certain embodiments, some or all steps of this process, and/or substantially equivalent steps, are performed by execution of processor-readable instructions stored or included on a non-transitory processor-readable storage medium, for example. For instance, references to a processor performing functions of the present disclosure refer to any one or more interworking computing components executing instructions, such as in the form of an algorithm, provided on a non-transitory processor-readable storage medium, such as a memory associated with a processor of a vehicle module, a power line communication module or a reflectometer module (when the reflectometer module is implemented using hardware) that receives pilot signals from at least one other module that is part of the PLC network.

Blocks 610 and 620 are the same or similar to blocks 510 and 520 described above. For sake of brevity the description of those blocks will not be repeated.

At 630, the processor retrieves an index for the new electrical state from a database.

The processor has access to and/or includes a database. Each electrical state has an index associated with it that can be used to retrieve PLC channel information from the database. For each particular electrical state index, the database includes corresponding PLC channel information. This PLC information can include (1) baseline reference information for this electrical state, and (2) a set or "library" of abnormal channel estimates for this electrical state, where each abnormal channel estimate is associated with a particular abnormality (e.g., specific type of abnormality). The baseline reference information can vary depending on the implementation. In one embodiment, the baseline reference information can include an expected channel estimate between a particular pair of PLC modules (i.e., a particular transmitter PLC module and a particular receiver PLC module). For example, in a distributed reflectometry system, each particular receiver PLC module will have baseline reference information associated with it and each particular transmitter PLC module in the network. By contrast, in a centralized reflectometry system, a centralized PLC module will have baseline reference information associated with all possible pairs of transmitter and receiver PLC modules.

For each electrical state, the baseline reference information will be different because different systems and subsystems will be coupled to the PLC network. In other words, for each particular electrical state, baseline reference information is specific to that particular electrical state. As will be described below, the baseline reference information can be used to detect abnormalities in a PLC channel. In one embodiment, the baseline reference information can include a known channel estimate that characterizes normal or expected channel estimate of the power line communication network (e.g., as a function of frequency) between a particular pair of PLC modules (i.e., a particular transmitter PLC module and a particular receiver PLC module) when they are communicating in that particular electrical state. In one embodiment, the baseline reference information can be specific characteristics or features of the expected channel estimate between a particular pair of PLC modules that are communicating in that particular electrical state. The baseline reference information for each electrical state can be measured during production (or at other times such as during servicing of the vehicle) and stored in a database. Alternatively, the baseline reference information for each electrical state can be collected dynamically when the vehicle is operating normally and stored in a database. This way any changes in the vehicle over time can be accounted for.

The set or "library" of abnormal channel estimates for this new electrical state can be a library of references (e.g., characteristic curves or traces). Each reference characterizes a different known, abnormal condition on the power line communication network (e.g., as a function of frequency when operating in that particular electrical state). In one embodiment, the set of abnormal channel estimates for this new electrical state can be a library of references, where each reference includes a particular abnormal channel estimate between a particular pair of PLC modules (i.e., a particular transmitter PLC module and a particular receiver PLC module). For example, in a distributed architecture, each particular receiver PLC module will have a set of abnormal channel estimates for each electrical state associated with it and each particular transmitter PLC module in the network. By contrast, in a centralized architecture, a centralized PLC module will have a set of abnormal channel estimates for each electrical state associated with all possible pairs of transmitter and receiver PLC modules. As noted above, a set of abnormal channel estimates for each electrical state can include a library of references, where each reference includes an abnormal channel estimate. As will be described below, the libraries can be used to diagnose the specific type and location of the abnormality. By comparing the actual, computed channel estimate to the set of abnormal channel estimates, a match can be found to thereby identify the specific type of abnormality on the power line communication network.

At 640, the processor uses the index for the new electrical state to retrieve and load PLC channel information relevant to the new electrical state from the database.

At 650, the processor uses a computed channel estimate to compute a metric. The computed channel estimate and metric can vary depending on the implementation. In one embodiment, the processor can receive the channel estimate from that was computed by another module. In another embodiment, the processor can compute the channel estimate based on the received pilot signals. For example, in one implementation, the processor receives pilot signals communicated over the power line communication network, measures characteristics of the pilot signals to obtain measured pilot signal characteristics, and then, based on these measured pilot signal characteristics, computes the computed channel estimate. The measured characteristics of the PLC channel can be discrete phase/amplitude pairs for each particular frequency band. In one embodiment, the metric can be a vector. For instance, in one implementation, the vector can include phase and amplitude information for the pilot signal at each subcarrier frequency value (e.g., discrete channel estimates sampled at different frequency bands).

At 660, the processor compares the metric to the baseline reference information (described above) for the new electrical state to determine the degree of correspondence between the metric in the baseline reference information (e.g., how well the metric matches the baseline reference information). The degree of correspondence between the metric and the baseline reference information can be determined in different ways on the embodiment and the type of metric and baseline reference information that are used. For instance, in one embodiment, where the metric and baseline reference information are in the form of a set of channel estimates, an absolute value of an overlapping area between the two sets of channel estimates can be used to determine the degree of correspondence between the metric and the baseline reference information. In other embodiments, where the metric and baseline reference information are in the form of vectors, a distance measure between the two vectors can be determined to determine the degree of correspondence between the metric and the baseline reference information. For example, in one embodiment, an average square error can be used as the distance measure between the two vectors. In another embodiment, a norm of order 1 of the difference between the metric vector and the baseline reference information vector can be used as the distance measure. In still other embodiments, other distance measures between metric vector and the baseline reference information vector can be used to determine the degree of correspondence between the metric in the baseline reference information. If the processor determines that there is a significant mismatch between the metric and the baseline reference information, then this indicates that there is an abnormality on the PLC channel (or in the PLC network). By contrast, if the processor determines that the metric and the baseline reference information substantially match, then this indicates that there are no abnormalities on the PLC channel (or in the PLC network).

At 670, the processor determines whether the degree of correspondence between metric and the baseline reference information is within a threshold. In one embodiment, to determine whether the computed power line communication channel estimate substantially corresponds to the expected power line communication channel estimate, the processor determines whether a difference between the metric and the baseline reference information is within a threshold. This way, the processor can determine whether a mismatch between the metric and the baseline reference information is greater than or equal to a threshold. For example, in one embodiment, to determine whether the mismatch is greater than or equal to a threshold, the processor can determine whether the distance measure between the metric vector and the baseline reference information vector is within a threshold (e.g., over several pilot sessions or packets).

When the processor determines, at 670, that the degree of correspondence between metric and the baseline reference information is within the threshold (e.g., when the mismatch between the metric and the baseline reference information is less than the threshold), it is determined that no abnormality has been detected on the PCL (or in the PLC network), and the method 600 loops back to 650.

When the processor determines, at 670, that the degree of correspondence between metric and the baseline reference information is not within a threshold (e.g., when the mismatch between the metric and the baseline reference information is greater than or equal to the threshold), it is determined that an abnormality has been detected on the PCL (or in the PLC network), and the method 600 may then proceed to optional step 680.

At optional step 680, the processor compares the computed channel estimate to a set of abnormal channel estimates for the new electrical state (that were loaded from the library at 640). For example, in one embodiment, the processor compares the computed channel estimate to a set of known, abnormal channel estimates for the new electrical state. The set of known, abnormal channel estimates can be a library of references (e.g., a set of curves/traces) that characterize different abnormal conditions on the power line communication network when operating in the new electrical state. When a match between the actual, computed channel estimates and the set of abnormal channel estimates is found, the processor has identified the specific type and location of the abnormality. In this regard, the abnormality can be, for example, a specific type of defect, fault or failure associated with this power line communication network, its location along the power line communication network, etc. Examples of abnormalities can include poor connections, degraded connections, short circuit conditions, open circuit conditions, other problematic conditions, in the power lines of the vehicle, or other problems with the vehicle modules themselves.

Once the specific type and location of the abnormality have been identified at 680, method 600 proceeds to 690. At 690, information about the new electrical state and the specific type and location of the abnormality can be stored so that it can then be used to diagnose the power line communication network.

The foregoing description has been presented for purposes of illustration and description, but is not intended to be exhaustive or limit the scope of the claims. The embodiments described above are described to best explain one practical application, and to enable others of ordinary skill in the art to understand the invention for various embodiments with various modifications as are suited to the particular use contemplated.

In some instances, well-known components, systems, or methods have not been described in detail in order to avoid obscuring the present disclosure. Therefore, specific operational and functional details disclosed herein are not to be interpreted as limiting, but merely as a representative basis for teaching one skilled in the art.

Those of skill in the art would further appreciate that the various illustrative logical blocks and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

The block diagrams in the FIGS. 1-4B illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that, in some alternative implementations, the functions noted in the block may occur out of the order noted in the figures. It will also be noted that each block of the block diagrams and/or flowchart illustration, and combinations of blocks in the block diagrams can be implemented by special purpose hardware-based systems that perform the specified functions or acts, or combinations of special purpose hardware and computer instructions.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

The detailed description provides those skilled in the art with a convenient road map for implementing the exemplary embodiment or exemplary embodiments. Many modifications and variations will be apparent to those of ordinary skill in the art without departing from the scope and spirit of the invention. For example, although some of the embodiments have been described with reference to frequency-domain reflectometry (FDR) techniques, it should be appreciated that these embodiments are non-limiting. In other embodiments, a reflectometry processor or reflectometer module can employ time-domain reflectometry (TDR) techniques. For instance, in a system that employs active TDR, the reflectometer module will send short-duration pulses over a power line, and then switch to a receive state to observe the waveform received over the power line and monitor reflections. The magnitude, duration and shape of the reflected waveform (i.e., step or impulse response) is analyzed to determine properties of the power line communication network.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system, comprising:
    a plurality of vehicle modules each comprising a power line communication module; and
    a power line communication network of a vehicle comprising: power lines configured to carry electric power to the vehicle modules, wherein the power line communication modules enable the power lines to communicate communication information to and from the vehicle modules, wherein the power line communication modules comprise:
        a first power line communication module that is configured to communicate pilot signals over the power line communication network, and
        a second power line communication module, comprising:
            a reflectometer module that is configured to perform reflectometry processing on the pilot signals to detect abnormalities in the power line communication network.

2. The system according to claim 1, wherein the reflectometer module is configured to determine a current electrical state of the vehicle, and to perform reflectometry processing, based on the current electrical state, to locate abnormalities in the power line communication network.

3. The system according to claim 1, wherein the reflectometer module is further configured to determine a current electrical state of the vehicle and to perform reflectometry processing based on the current electrical state to characterize abnormalities in the power line communication network and determine a specific type of abnormality.

4. The system according to claim 1, wherein the reflectometer module comprises:
    a frequency-domain reflectometer module (FDR) configured to determine a current electrical state of the vehicle, and to compare an actual power line communication channel estimate to a set of reference power line communication channel estimates for that particular current electrical state to determine whether there is a match between the actual power line communication channel estimate and one of the reference power line communication channel estimates for that particular current electrical state.

5. The system according to claim 4, wherein the set of reference power line communication channel estimates for that particular current electrical state comprise at least one of: reference power line communication channel estimates that indicate defects; reference power line communication channel estimates that indicate faults; reference power line communication channel estimates that indicate failures in power lines of the vehicle; and reference power line communication channel estimates that indicate abnormalities in vehicle modules.

6. The system according to claim 1, wherein the second power line communication module is implemented within a vehicle health monitoring module (VHMM), and further comprising:
    a third power line communication module that is configured to communicate other pilot signals over the power line communication network, and
    wherein the reflectometer module is configured to perform reflectometry processing on the pilot signals and the other pilot signals to detect abnormalities in the power line communication network.

7. A vehicle, comprising:
a power line communication network, comprising: a plurality of power lines, wherein each of the power lines is designed to carry electric power; and
a plurality of vehicle modules each being connected to at least one of the power lines, wherein each vehicle module comprises: a power line communication module, communicatively coupled to at least one of the power lines, wherein the power line communication modules enable the power lines to communicate communication information to and from the vehicle modules,
wherein at least one of the power line communication modules comprises:
a reflectometer module configured to perform reflectometry processing on pilot signals communicated over the power line communication network to determine properties of the power line communication network.

8. The vehicle according to claim 7, wherein the reflectometer module is configured to determine a current electrical state of the vehicle, and to perform reflectometry processing, based on the current electrical state, to detect abnormalities in the power line communication network.

9. The vehicle according to claim 8, wherein the reflectometer module is configured to perform reflectometry processing, based on the current electrical state, to locate abnormalities in the power line communication network.

10. The vehicle according to claim 8, wherein the reflectometer module is further configured to perform reflectometry processing, based on the current electrical state, to characterize abnormalities in the power line communication network.

11. The vehicle according to claim 7, wherein the reflectometer module comprises:
a frequency-domain reflectometer module (FDR) configured to determine a current electrical state of the vehicle, and to compare an actual power line communication channel estimate to a set of reference power line communication channel estimates for that particular current electrical state to determine whether there is a match between the actual power line communication channel estimate and one of the reference power line communication channel estimates for that particular current electrical state.

12. The vehicle according to claim 11, wherein the set of reference power line communication channel estimates for that particular current electrical state comprise at least one of: reference power line communication channel estimates that indicate defects; reference power line communication channel estimates that indicate faults; reference power line communication channel estimates that indicate failures in power lines of the vehicle; and reference power line communication channel estimates that indicate abnormalities in vehicle modules.

13. The vehicle according to claim 7, in response to determining that there has been a change from an existing electrical state to a new electrical state, wherein the reflectometer module is configured to:
measure characteristics of pilot signals received over the power line communication network;
compute a power line communication channel estimate based on the measured characteristics of the pilot signals;
compute, based on the computed power line communication channel estimate, a metric for the new electrical state;
access channel information comprising: baseline reference information for the new electrical state, wherein the baseline reference information comprises: information that characterizes an expected power line communication channel estimate for the new electrical state when the power line communication network has no abnormalities;
determine whether a degree of correspondence between the metric in the baseline reference information is within a threshold to determine whether the computed power line communication channel estimate substantially corresponds to the expected power line communication channel estimate,
when the degree of correspondence between the metric and the baseline reference information is not within the threshold, detect an abnormality in the power line communication network and record the new electrical state and an indication that the abnormality has been detected in the power line communication network.

14. The vehicle according to claim 13, wherein the channel information further comprises: a set of known, abnormal power line communication channel estimates for the new electrical state, wherein each of the known, abnormal power line communication channel estimates is associated with a particular, specific type of abnormality, and when the degree of correspondence between the metric and the baseline reference information is not within the threshold, wherein the reflectometer module is further configured to:
identify a specific type of abnormality detected on the power line communication network by: comparing the computed power line communication channel estimate to each one of the set of known, abnormal power line communication channel estimates for the new electrical state to find one that matches the computed power line communication channel estimate; and
record the new electrical state, the indication that the abnormality has been detected in power line communication network, the specific type of abnormality detected, and the location of the abnormality within the power line communication network.

15. The vehicle according to claim 14, wherein the set of known, abnormal power line communication channel estimates for the new electrical state can be used to determine a specific type and location of an abnormality by matching the computed power line communication channel estimate to a particular one of the set of abnormal power line communication channel estimates to thereby identify the specific type of abnormality on the power line communication network.

16. The vehicle according to claim 14, wherein the set of known, abnormal power line communication channel estimates for the new electrical state comprises:
a library of references that characterize different abnormal conditions on the power line communication network when operating in the new electrical state, wherein each reference characterizes a different known, abnormal condition on the power line communication network between a particular transmitter power line communication module and a particular receiver power line communication module as a function of frequency when operating in that particular electrical state.

17. The vehicle according to claim 7, wherein the second power line communication module is implemented within a vehicle health monitoring module (VHMM), and further comprising:

a third power line communication module that is configured to communicate other pilot signals over the power line communication network, and wherein the reflectometer module is configured to perform reflectometry processing on the pilot signals and the other pilot signals to detect abnormalities in the power line communication network.

18. In a vehicle comprising a plurality of vehicle modules each having a power line communication module, a method for detecting abnormalities in a power line communication network comprising power lines designed to carry electric power to the vehicle modules and to communicate communication information to and from the vehicle modules, the method comprising:

communicating pilot signals from a power line communication module over the power line communication network; and in response to determining that there has been a change from an existing electrical state to a new electrical state, processing the pilot signals by a reflectometer module of another power line communication module to determine whether an abnormality has been detected in the power line communication network.

19. The method according to claim 18, wherein processing the pilot signals, comprises:

measuring characteristics of the pilot signals received over the power line communication network;

computing a power line communication channel estimate based on the measured characteristics of the pilot signals;

computing, based on the computed power line communication channel estimate, a metric for the new electrical state;

accessing channel information comprising: baseline reference information for the new electrical state, wherein the baseline reference information comprises: information that characterizes an expected power line communication channel estimate for the new electrical state when the power line communication network has no abnormalities;

determining whether a degree of correspondence between the metric in the baseline reference information is within a threshold to determine whether the computed power line communication channel estimate substantially corresponds to the expected power line communication channel estimate;

detecting, when the degree of correspondence between the metric and the baseline reference information is not within the threshold, an abnormality in the power line communication network; and recording the new electrical state and an indication that the abnormality has been detected in the power line communication network.

20. The method according to claim 19, wherein the channel information further comprises: a set of known, abnormal power line communication channel estimates for the new electrical state, wherein each of the known, abnormal power line communication channel estimates is associated with a particular, specific type of abnormality and characterizes a specific abnormal condition on the power line communication network when operating in the new electrical state, and when the degree of correspondence between the metric and the baseline reference information is not within the threshold, further comprising:

identifying a specific type of abnormality detected on the power line communication network by: comparing the computed power line communication channel estimate to each one of the set of known, abnormal power line communication channel estimates to find one of the references that matches the computed power line communication channel estimate; and wherein recording comprises:

recording the new electrical state, the indication that the abnormality has been detected in power line communication network, the specific type of abnormality detected, and the location of the abnormality within the power line communication network.

* * * * *